United States Patent
Kusakabe et al.

(10) Patent No.: US 7,407,723 B2
(45) Date of Patent: Aug. 5, 2008

(54) POLYMER ELECTROLYTE FUEL CELL

(75) Inventors: Hiroki Kusakabe, Sakai (JP); Kazuhito Hatoh, Osaka (JP); Toshihiro Matsumoto, Takatsuki (JP); Norihiko Kawabata, Hirakata (JP); Yoshiki Nagao, Ibaraki (JP); Shinsuke Takeguchi, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 453 days.

(21) Appl. No.: 11/048,049

(22) Filed: Feb. 2, 2005

(65) Prior Publication Data

US 2006/0115710 A1 Jun. 1, 2006

(30) Foreign Application Priority Data

Feb. 2, 2004 (JP) .............................. 2004-026097

(51) Int. Cl.
*H01M 4/94* (2006.01)
*H01M 8/10* (2006.01)
*H01M 8/02* (2006.01)

(52) U.S. Cl. .............................. 429/44; 429/38; 429/30

(58) Field of Classification Search .................. 429/44, 429/38, 30
See application file for complete search history.

(56) References Cited

U.S. PATENT DOCUMENTS 7,070,872 B2 * 7/2006 Sugiura et al. ................ 429/26

FOREIGN PATENT DOCUMENTS

JP 08-045517 * 2/1996

* cited by examiner

*Primary Examiner*—Patrick Ryan
*Assistant Examiner*—Angela Martin
(74) *Attorney, Agent, or Firm*—McDermott Will & Emery LLP

(57) ABSTRACT

In a polymer electrolyte fuel cell, at least one of the anode side separator plate and cathode side separator plate is formed with a main surface having a convex shape protruding toward a gas diffusion layer, and a peripheral edge portion surrounding the main surface. An average thickness of the main surface is made to be thicker than an average thickness of the peripheral edge portion. And a difference $\Delta t$ between the thickest part of the main surface and an average thickness of the peripheral edge portion is made to be 5-30 μm.

18 Claims, 7 Drawing Sheets

F I G. 1 2
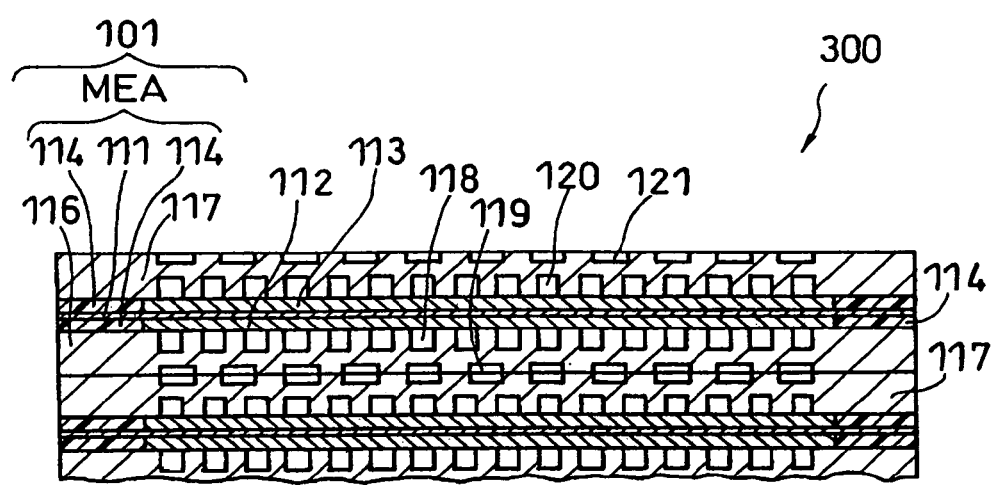

POLYMER ELECTROLYTE FUEL CELL

BACKGROUND OF THE INVENTION

The present invention relates to a polymer electrolyte fuel cell to be used for a portable power source, an electric vehicle, a household cogeneration system, and so on.

In a polymer electrolyte fuel cell, a fuel gas containing hydrogen and an oxidant gas containing oxygen such as air are electrochemically reacted to generate an electric energy and a thermal energy simultaneously. FIG. 12 is a schematic sectional view that shows a basic structure of a conventional polymer electrolyte fuel cell.

A unit cell 101, which is a basic structure in a conventional polymer electrolyte fuel cell 300, mainly comprises a polymer electrolyte membrane 111 which selectively transfers cation (hydrogen ion), and a pair of electrodes (anode and cathode) 112, 113 disposed on both sides of the polymer electrolyte membrane 111. An anode 112 and a cathode 113 are composed of a catalyst layer comprising a mixture of a carbon powder carrying an electrode catalyst (platinum for example) and a hydrogen ion conductive polymer electrolyte, and a gas diffusion layer comprising for example a water repellent treated carbon paper, formed on outside of the catalyst layer and having both gas permeability and electron conductivity.

Then, gas sealing members 114 such as gasket are disposed to sandwich the polymer electrolyte membrane 111, at the peripheries of the anode 112 and the cathode 113 to avoid leaking of the fuel gas and the oxidant gas to outside and mixing of the fuel gas and the oxidant gas together. The sealing member 114 is integrated with the anode 112, the cathode 113, and the polymer electrolyte membrane 111 to form a membrane-electrode assembly (MEA hereafter). Outside the MEA, an anode side separator 116 and a cathode side separator 117 having electric conductivity are disposed to mechanically fix MEA and electrically connect adjacent MEAs each other in series.

In portions of the anode side separator 116 and the cathode side separator 117 contacting with the MEA, gas flow paths 118, 120 are formed to supply reactant gases (fuel gas and oxidant gas) to the anode 112 and the cathode 113 respectively, and to remove a generated gas and an excess gas. Although the gas flow paths 118, 120 may be provided separately from the anode side separator plate 116 and the cathode side separator plate 117, generally, grooves are formed on the surfaces of the anode side separator plate 116 and the cathode side separator plate 117 to serve as the gas flow paths, as shown in FIG. 12.

These MEA, the anode side separator 116, and the cathode side separator 117 form the unit cell 101. Although the unit cell 101 is used alone in some cases, in order to obtain sufficient cell output, the MEA is stacked alternately with the anode side separator 116 and the cathode side separator 117 interposing a cooling unit (not shown) to form a stack (i.e., 10-200 unit cells 101 are stacked). Then, generally, the stack is sandwiched by end plates, with current collector plates and insulating plates interposed in between, and fastened together with fastening bolts and nuts from both sides thereof, thereby making the polymer electrolyte fuel cell 300.

In such a conventional polymer electrolyte fuel cell 300, the anode side separator plate 116 and the cathode side separator plate 117 are formed of carbon flat plates, and on sides contacting the anode 112 and the cathode 113, the gas flow paths 118, 120 for supplying fuel gas or oxidant gas are respectively formed, and on the other side, coolant water flow paths 119, 121 for circulating coolant water are formed. Then, generally, a main surface at a center part of the anode side separator 116 and the cathode side separator 117 where the gas flow path is formed, and a peripheral edge portion at a surrounding part contacting one side of gaskets sandwiching the polymer electrolyte membrane 111 form the same plane without any elevation change.

Here, in the polymer electrolyte fuel cell 300 as mentioned above, the MEA is sandwiched by the anode side separator plate 116 and the cathode side separator plate 117, keeping an appropriate pressure in between the three; the polymer electrolyte membrane 111, the anode 112, and the cathode 113. This is because, it is desired to bring a gas diffusion layer of the anode 112 into contact with the anode side separator plate 116, and to bring a gas diffusion layer of the cathode 113 into contact with the cathode side separator plate 117.

It is also desired to compress a pair of gaskets 114 sandwiching peripheral edge portions of the polymer electrolyte membrane 111 by the anode side separator plate 116 and the cathode side separator plate 117 to seal a peripheral edge portion of the MEA. At this time, the compression degree {i.e., a thickness of a gasket which decreases due to the compression (a difference between a thickness of a gasket before the compression and a thickness of a gasket after the compression)} defines a contact force between a gas diffusion layer of the anode 112 and the anode side separator plate 116, and a contact force between a gas diffusion layer of the cathode 113 and the cathode side separator plate 117.

However, in the anode side separator plate 116 and the cathode side separator plate 117, when a part (main surface) contacting the anode 112 or the cathode 113 and a part (peripheral edge portion) contacting the gasket 114 are in the same plane, like above, in the case the main surface becomes thinner than the peripheral edge portion due to manufacturing tolerance, a sufficient contact between the gas diffusion layer and the anode side separator plate 116 or the cathode side separator plate 117 can not be secured, thereby increasing electric resistance between them. This frequently happens when the gas diffusion layer is formed of a soft material such as a carbon paper. Therefore, in order to suppress such increase in electric resistance, a contact force between the main surface and the gas diffusion layer must be made stronger, by further increasing the compression degree of the gasket 114.

On the other hand, in the case an average thickness of the main surface of the anode side separator plate 116 or the cathode side separator plate 117 is excessively thicker than an average thickness of the peripheral edge portion, when the gasket 114 is compressed such that an appropriate seal ability is obtained, the main surface of the anode side separator plate 116 or the cathode side separator plate 117 excessively compresses the gas diffusion layer. In such case, gas diffusivity is disturbed to create problems: pressure loss of the unit cell 101 is increased, and the gas diffusion layer is buckled to damage the MEA. Furthermore, because the gas diffusion layer enters into the gas flow path 118, 120 formed on the main surface, and closes the gas flow path, an increase in pressure loss of the gas flow path 118, 120 raises possibility of uneven distribution of the reactant gas to the gas flow path 118, 120.

Furthermore, because the MEA, the anode side separator plate 116, and the cathode side separator plate 117 are clamped, the peripheral edge portions of the anode side separator plate 116 and the cathode side separator plate 117 are bent by the clamping force, thereby making contact with the MEA. In the case the anode side separator plate 116 and the cathode side separator plate 117 are planer as in the above, this bent will add a partial load on a peripheral edge portion of the gas diffusion layer, leading to problems in that the gas diffusion layer gives damage on the polymer electrolyte membrane 111, creating a pinhole on the polymer electrolyte membrane 111.

The present invention was made in view of the foregoing problems, and an object of the present invention is to provide a polymer electrolyte fuel cell in which a sealing effect can be displayed without gas leak by compressing a gasket sufficiently, increase in electrical resistance (contact resistance) between a gas diffusion layer of an anode and an anode side separator plate, and between a gas diffusion layer of a cathode and a cathode side separator plate can be suppressed, and increase in pressure loss due to close of a gas flow path and damage to a polymer electrolyte membrane by the gas diffusion layer can be avoided. Further, another object of the present invention is to provide a separator plate that can easily and reliably embody the above mentioned polymer electrolyte fuel cell.

BRIEF SUMMARY OF THE INVENTION

In order to solve the above problems, the present invention provides a polymer electrolyte fuel cell comprising: a membrane-electrode assembly having a hydrogen ion conductive polymer electrolyte membrane, and an anode and a cathode sandwiching the polymer electrolyte membrane; and an anode side separator plate and a cathode side separator plate disposed to support the membrane-electrode assembly from both sides thereof, the anode and the cathode each having a gas diffusion layer and a catalyst layer contacting the polymer electrolyte membrane;

wherein at least one of the anode side separator plate and the cathode side separator plate includes a main surface contacting the gas diffusion layer and a peripheral edge portion surrounding the main surface, and is structured to be substantially plane;

the main surface has a convex shape protruding toward the gas diffusion layer side, and has a gas flow path for supplying a reactant gas to said anode or said cathode; and an average thickness of the main surface part is thicker than an average thickness of the peripheral edge portion part, and a difference $\Delta t$ between a thickness of the thickest part of the main surface part and an average thickness of the peripheral edge portion part is 5-30 µm.

Here, a "main surface" of a separator plate in the present invention refers to a part of a separator plate contacting an anode or a cathode. More specifically, a "main surface" of a separator plate refers to a part in a center of a separator plate, including a part at least corresponding to a region that has the same size and shape with a figure showing an anode or a cathode when a membrane-electrode assembly is projected along the direction of the normal line (in the equal magnification)(a figure showing "an anode side or a cathode side" as a result of the projection). Therefore, the above "main surface" has the same area with the above region, or has the area larger than the above region.

A "peripheral edge portion" surrounding the "main surface" of the separator plate above is a peripheral edge region of the main surface and a region other than the region having a protruding convex shape, and is integrally formed with the above "main surface." Although the above "main surface" has a convex shape protruding toward a side of the gas diffusion layer, the separator plate according to the present invention formed with the "main surface" and the "peripheral edge portion" is structured to be substantially plane as a whole. Therefore, the above "peripheral edge portion" can be plane or can be curved.

Additionally, an "average thickness" of the main surface is an arithmetic average of thickness measured by measuring different measuring points of not less than five within a region having a protruding convex. However, a point among the five different measuring points is to be a geometric center (barycenter) in the region having a protruding convex. This geometric center (barycenter) may correspond to the thickest part of the main surface.

Further, an "average thickness" of the peripheral edge portion is an arithmetic average of thickness measured by different measurement points of not less than 8 in the peripheral edge portion as defined above.

In a polymer electrolyte fuel cell of the present invention, by forming a structure such as above in at least one of an anode side separator plate and a cathode side separator plate (preferably both), the following polymer electrolyte fuel cell can be easily and reliably embodied: even with a sufficient compression of gasket to embody a sealing effect without gas leak, an increase in electrical resistance (contact resistance) between a gas diffusion layer of an anode and an anode side separator plate, and between a gas diffusion layer of a cathode and a cathode side separator plate can be suppressed, and an increase in pressure loss due to close of a gas flow path and damage to a polymer electrolyte membrane by the gas diffusion layer can be avoided.

Further, the present invention provides a polymer electrolyte fuel cell comprising: two or more membrane-electrode assemblies having a hydrogen ion conductive polymer electrolyte membrane, and an anode and a cathode sandwiching the polymer electrolyte membrane; and two or more separator plates stacked alternately with the membrane-electrode assemblies, each of the anode and the cathode having a gas diffusion layer and a catalyst layer contacting said polymer electrolyte membrane;

wherein at least one of the separator plates is a composite separator plate comprising a combination of an anode side separator plate and a cathode side separator plate;

each of the anode side separator plate and the cathode side separator plate includes a main surface contacting the anode and the cathode, and a peripheral edge portion surrounding the main surface, and is structured to be substantially plane;

the main surfaces have a convex shape protruding toward the anode side and the cathode side respectively, and have a gas flow path for supplying a fuel gas and an oxidant gas to the anode and the cathode respectively; and an average thickness of the main surface part is thicker than an average thickness of the peripheral edge portion part, and a difference $\Delta t$ between a thickness of the thickest part of the main surface part and an average thickness of the peripheral edge portion part is 5-30 µm.

Here, a "composite separator plate" in a polymer electrolyte fuel cell of the present invention such as the above is a composite separator plate comprising a combination of an anode side separator plate and a cathode side separator plate, in which the anode side separator plate and the cathode side separator plate are integrally formed.

In a polymer electrolyte fuel cell of the present invention such as the above, by forming a structure such as the above in at least one of the stacked separator plates, the following polymer electrolyte fuel cell can be easily and reliably embodied: increase in electrical resistance (contact resistance) between a gas diffusion layer of an anode and an anode side separator plate, and between a gas diffusion layer of a cathode and a cathode side separator plate can be suppressed, while sealing effect can be displayed without gas leak by compressing a gasket sufficiently, and increase in pressure loss due to close of a gas flow path and damage to a polymer electrolyte membrane by the gas diffusion layer can be avoided.

According to the present invention, the following polymer electrolyte fuel cell can be easily and reliably embodied: even a sealing effect is displayed without gas leak by compressing a gasket sufficiently, increase in electrical resistance (contact resistance) between a gas diffusion layer of an anode and an anode side separator plate, and between a gas diffusion layer of a cathode and a cathode side separator plate can be suppressed, and increase in pressure loss due to close of a gas flow path and damage to a polymer electrolyte membrane by the gas diffusion layer can be avoided.

BRIEF DESCRIPTION OF THE SEVERAL VIEWS OF THE DRAWING

FIG. 12 is a schematic sectional view illustrating a basic structure of a first embodiment of a conventional polymer electrolyte fuel cell.

DETAILED DESCRIPTION OF THE INVENTION

Hereinafter, preferred embodiments to carry out the present invention will be described with reference to the drawings. In the following description, same reference numbers are used for the same or corresponding part, and repetitive description may be omitted.

EMBODIMENT 1

Figure 1:
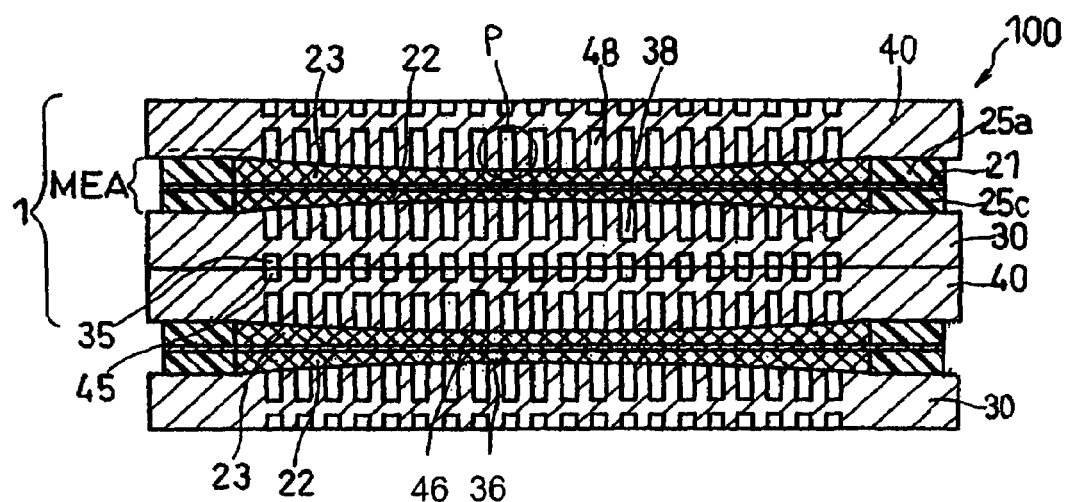
FIG. 1 is a schematic sectional view illustrating a basic structure of the polymer electrolyte fuel cell in Embodiment 1 of the present invention.

FIG. 1 is a schematic sectional view illustrating a basic structure of a polymer electrolyte fuel cell in Embodiment 1 of the present invention. As shown in FIG. 1, a unit cell 1, i.e., a basic structure of the polymer electrolyte fuel cell 100 in this embodiment, mainly comprises a polymer electrolyte membrane 21 which selectively transfers cation (hydrogen ion), and a pair of electrodes (anode and cathode) 22, 23 disposed on both sides of the polymer electrolyte membrane 21. A cathode 22 and an anode 23 are composed of a catalyst layer comprising a mixture of a carbon powder carrying an electrode catalyst (platinum for example) and a hydrogen ion conductive polymer electrolyte, and a gas diffusion layer comprising for example a water repellent treated carbon paper, formed on outside of the catalyst layer and having both gas permeability and electron conductivity.

Then, gas sealing members such as gaskets 25a and 25c are disposed to sandwich the polymer electrolyte membrane 21, at the peripheries of the cathode 22 and the anode 23 to avoid leaking of fuel gas and oxidant gas to outside and mixing of fuel gas and oxidant gas together. These gaskets 25a and 25c are integrated with the cathode 22, the anode 23, and the polymer electrolyte membrane 21 to form a membrane-electrode assembly (MEA). Outside the MEA, a cathode side separator plate 30 and an anode side separator plate 40 having electric conductivity are disposed to mechanically fix the MEA and electrically connect adjacent MEAs each other in series.

The MEA, the cathode side separator plate 22, and the anode side separator plate 23 form the unit cell 1. The unit cell 1 is stacked with the cathode side separator plate 22 and the anode side separator plate 23 interposing a cooling unit comprising a coolant water flow path 35 of the cathode side separator plate 22 and a coolant water flow path 45 of the anode side separator plate 23 to form the polymer electrolyte fuel cell 100 comprising a stack of this embodiment. Although not shown, the above stack is sandwiched by end plates, with current collector plates and insulating plates interposed in between, and fastened together with fastening bolts and nuts from both sides thereof, thereby forming the polymer electrolyte fuel cell 100.

As described above, a conventional polymer electrolyte fuel cell had various problems due to the flat plate shape of the cathode side separator plate and the anode side separator plate. However, in the polymer electrolyte fuel cell 100 of this embodiment, the cathode side separator plate and the anode side separator plate having a characteristic structure is used in order to solve the problems. These separator plates are described in detail in the following.

Figure 2:
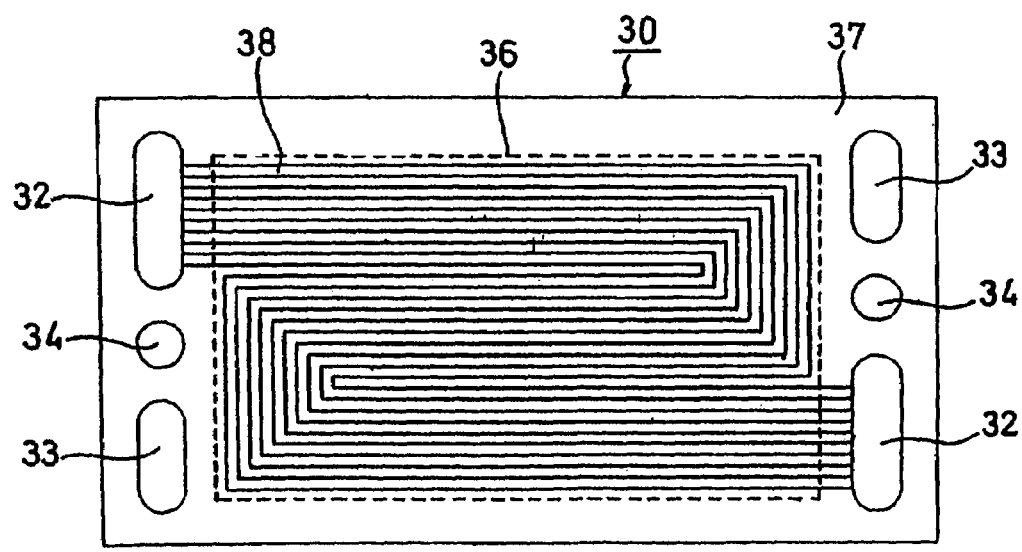
FIG. 2 is a front view enlarging a main portion of the cathode side separator plate 30 of the polymer electrolyte fuel cell 100 in the embodiment shown in FIG. 1 (a front view seen from the side of a gas flow path 38).
Figure 3:
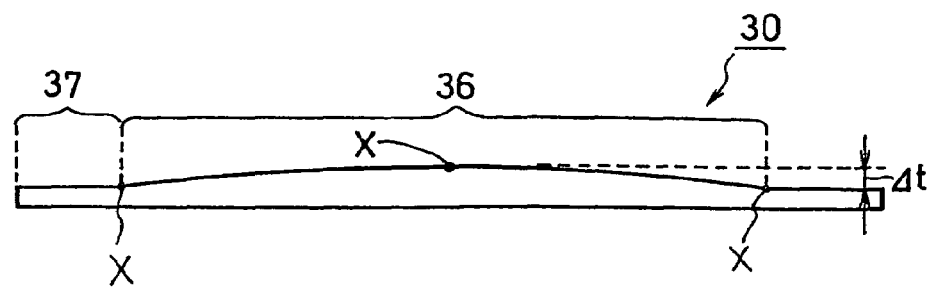
FIG. 3 is a schematic sectional view illustrating the cathode side separator plate 30 shown in FIG. 2 (a cross section in a direction perpendicular to a main surface 36).
Figure 4:
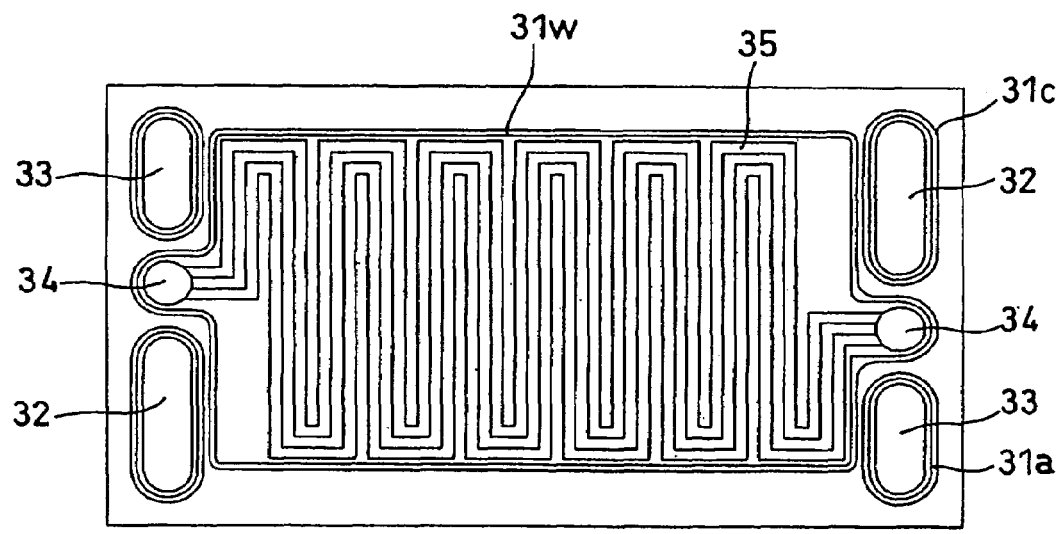
FIG. 4 is a rear view enlarging a main portion of the cathode side separator plate 30 shown in FIG. 2 (a front view seen from the coolant water flow path 35 side).

FIG. 2 is a front view enlarging a main portion of the cathode side separator plate 30 of the polymer electrolyte fuel cell 100 in this embodiment shown in FIG. 1 (a front view seen from the gas flow path 38 side). FIG. 3 is a schematic sectional view illustrating the cathode side separator plate 30 shown in FIG. 2 (a cross section in a direction perpendicular to a main surface 36) (Therefore, the gas flow path 38 and the coolant water flow path 35 are omitted). Additionally, FIG. 4 is a rear view enlarging a main portion of the cathode side separator plate 30 shown in FIG. 2 (a front view seen from the coolant water flow path 35 side).

Figure 5:
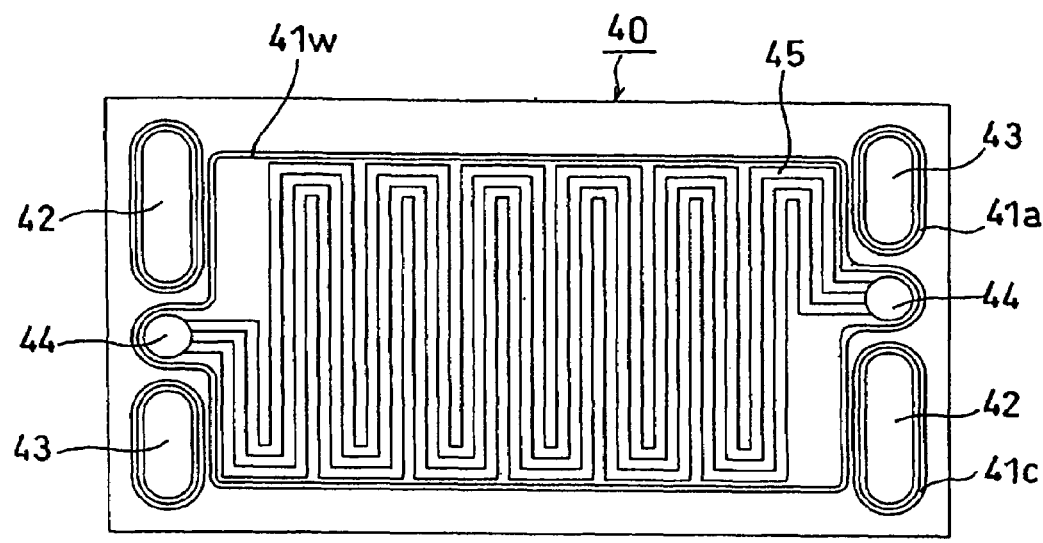
FIG. 5 is a front view enlarging a main portion of an anode side separator plate 40 in the polymer electrolyte fuel cell 100 in the embodiment shown in FIG. 1 (a front view seen from the coolant water flow path 45 side).
Figure 6:
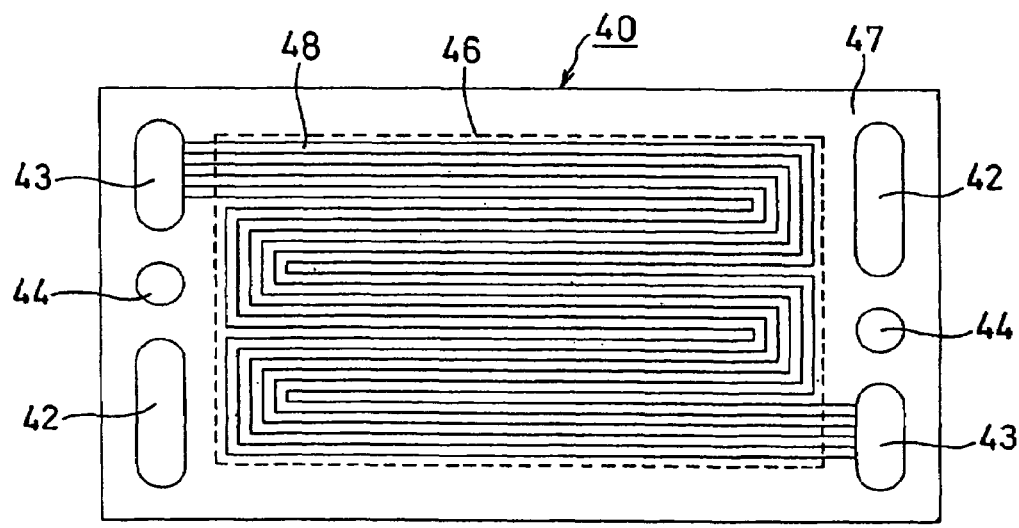
FIG. 6 is a rear view enlarging a main portion of the anode side separator plate 40 shown in FIG. 5 (a front view seen from the gas flow path 48 side).

Further, FIG. 5 is a front view enlarging a main portion of the anode side separator plate 40 in the polymer electrolyte fuel cell 100 in this embodiment shown in FIG. 1 (a front view seen from the coolant water flow path 45 side), and FIG. 6 is a rear view enlarging a main portion of the anode side separator plate 40 shown in FIG. 5 (a front view seen from the gas flow path 48 side).

The cathode side separator plate 30 is formed of the main surface (a part corresponding to the region enclosed by broken line) 36 contacting the cathode 22, and the peripheral edge portion 37 surrounding the main surface 36 and being integrated with the main surface 36, as shown in FIG. 2. The peripheral edge portion 37 is provided with an oxidant gas manifold aperture 32, a fuel gas manifold aperture 33, and a coolant water manifold aperture 34. The main surface 36 has the gas flow path 38 for supplying the oxidant gas to the cathode 22, and the gas flow path 38 is structured to connect with the oxidant gas manifold aperture 32.

The main surface 36 has a convex shape protruding toward outside (i.e., toward the cathode 22 side), as shown in FIG. 3, and therefore, an average thickness of the main surface 36 part is thicker than an average thickness of the peripheral edge portion 37 part. Additionally, although an elevation change is provided at a connection part between the main surface 36 and the peripheral edge portion 37 in the cathode side separator plate 30, a rear side of the cathode side separator plate 30 has the coolant water flow path 35 while structured to have a single flat surface without any elevation change.

On the other hand, the anode side separator plate 40 is formed of the main surface (a part corresponding to the region enclosed by broken line) 46 contacting the anode 23, and the peripheral edge portion 47 surrounding the main surface 46 and being integrated with the main surface 46, as shown in FIG. 6. The peripheral edge portion 47 is provided with an oxidant gas manifold aperture 42, a fuel gas manifold aperture 43, and a coolant water manifold aperture 44. The main surface 46 has the gas flow path 48 for supplying the fuel gas to the anode 23, and the gas flow path 48 is structured to connect with the fuel gas manifold aperture 43.

Though not shown, the main surface 46 also has a convex shape protruding toward outside (i.e., toward the anode 23 side) similar to the main surface 36 of the cathode side separator plate 30 shown in FIG. 3, and although an elevation change is provided at a connection part between the main surface 46 and the peripheral edge portion 47 in the anode side separator plate 40, a rear side of the anode side separator plate 40 has the coolant water flow path 45 while structured to have a single flat surface without any elevation change.

It is preferable that an average thickness of the main surfaces 36, 46 part is thicker than an average thickness of the peripheral edge portions 37, 47 part, and a difference $\Delta t$ (ref. FIG. 3) between a thickness of the thickest part of the main surfaces 36, 46 and an average thickness of the peripheral edge portions 37, 47 part is 5-30 μm. This is due to the fact that when the thickness is below 5 μm, contact resistance between the main surfaces 36, 46 part and the gas diffusion layer is increased, and when the thickness is over 30 μm, the gas diffusion layer is excessively compressed and a pressure loss is increased. In particular, from the viewpoint of securely obtaining the effect of the present invention, it is preferable that the difference $\Delta t$ is 5-10 μm.

Also, when using the cathode side separator plate 30 and the anode side separator plate 40 of this embodiment satisfying the difference $\Delta t$ of the above, it is preferable that a thickness of the gas diffusion layer is 150-200 μm. This is due to the fact that when the thickness is 150 μm or more, the pressure loss can be suppressed to be less, and when the thickness is 200 μm or less, a sub flow {a flow of the reactant gas which only passes through the gas diffusion layer, not passing through the gas flow path (an increase in the sub flow will make a part being not utilized in the catalyst layer, thereby decreasing an utilization rate for an electrode)} is suppressed, and the reactant gas can be supplied to the whole cathode 22 and cathode 23.

When the above conditions regarding $\Delta t$ and the thickness of the gas diffusion layer are satisfied, a cross sectional area of the gas flow paths 38, 48 can be made substantially uniform in all over the main surfaces 36, 46, at the time the MEA is clamped with the cathode side separator plate 30 and the anode side separator plate 40, and thus preferable.

Figure 7:
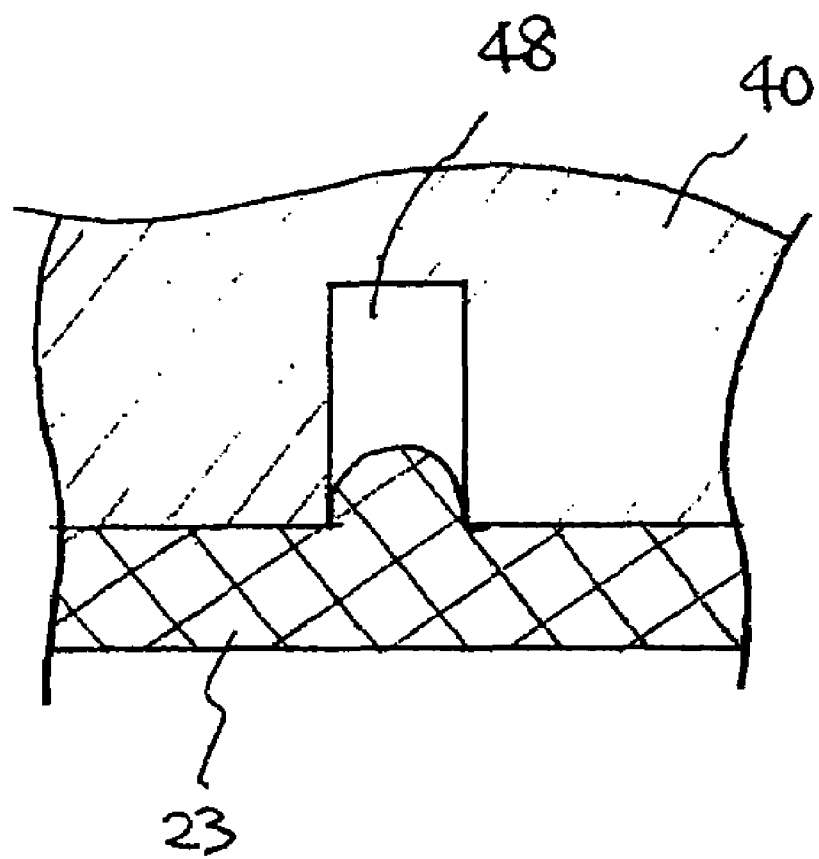
FIG. 7 is a view enlarging a portion shown by P in FIG. 1.

Here, "the state in which an cross sectional area of the gas flow path being substantially uniform all over the main surface" is described by using FIG. 1 and FIG. 7. FIG. 7 is a view enlarging a part shown by P in FIG. 1 at the time of clamping the polymer electrolyte fuel cell 100 in this embodiment. As shown in FIG. 7, the gas diffusion layer part of the anode 23 enters into the gas flow path 48 at the time of the clamping. However, in this embodiment, the anode side separator plate 40 is previously designed upon predicting (grasping) a degree of such entering. Therefore, at the time of the clamping, on a plane perpendicular to the figure, a cross sectional area of the grooves forming the gas flow path 48 in a center side of the main surface and a cross sectional area of the grooves forming the gas flow path 48 in a peripheral edge portion side become substantially uniform. Therefore, it refers to a state in which cross sectional areas of a groove which the reactant gas actually passes through is being uniform all over the anode side separator plate 40. The same goes for the cathode side.

Especially, when the clamping pressure is made to become 5-30 kgf/cm$^2$, the above effect can be obtained reliably.

Also, as shown in FIG. 3, it is preferable that a cross section in a direction perpendicular to the main surfaces 36, 46 is formed with a smooth curve from a center part of the main surfaces 36, 46 toward the peripheral edge portions 37, 47, and further, the curve has an inflection point X. Based on this, it has a merit in that the clamping pressure can be made equal in all over the gas diffusion layer.

It is preferable that the cathode side separator plate 30 and the anode side separator plate 40 are formed from a molded article including a conductive carbon powder and a binder. Further, it is preferable to use a separator plate which is obtained by preparing a green sheet by an extrusion molding a kneaded material including 70-80 parts by weight of a conductive carbon powder such as an expanded graphite powder, for example, and 20-30 parts by weight of a binder such as a phenolic resin, for example, and then by compression molding the green sheet. When the phenolic resin is used as a binder, the appropriate compression molding temperature is 160° C., and appropriate molding surface pressure is 350-500 kgf/cm$^2$.

When the above green sheet is compression molded, it is preferable that the green sheet is compressed to have 60-75% volume of the volume before the molding. When an average difference $\Delta t$ is 5-30 μm upon molding the separator plate having a shape like the above, a density of the obtained separator plate becomes almost equal overall by using the above compression rate, and moldability becomes excellent. It is preferable that the density of the separator plate after the molding is 1.5-2.0 g/cm$^3$.

The appropriate thickness of the thickest part of the cathode side separator plate 30 and the anode side separator plate 40 in this embodiment (i.e., the thickest part of the main surfaces 36, 48) is approximately 3 mm. The appropriate thickness of the gaskets 25c, 25a is 0.3-1.0 mm.

A pair of oxidant gas manifold apertures 32 provided in the cathode side separator plate 30 is connected with a pair of fuel gas manifold apertures 42 provided in the anode side separator plate 40, and a pair of fuel gas manifold apertures 33 provided in the cathode side separator plate 30 is connected with a pair of fuel gas manifold apertures 43 provided in the anode side separator plate 40. Also, a pair of coolant water manifold apertures 34 provided in the cathode side separator plate 30 is connected with a pair of coolant water manifold apertures 44 provided in the anode side separator plate 40.

Therefore, one of the pair of the oxidant gas manifold apertures 32 is an entrance and the other is an exit. Also, in the case of the pair of the oxidant gas manifold apertures 42, the pair of the fuel gas manifold apertures 33, the pair of the fuel gas manifold apertures 43, the pair of the coolant water manifold apertures 34, and the pair of the coolant water manifold apertures 44, similarly, one is an entrance and the other is an exit.

In this embodiment, a groove 31c and a groove 31a, enclosing the oxidant gas manifold aperture 32 and the fuel gas manifold aperture 33 respectively, and a groove 31w enclosing the coolant water manifold aperture 34 and the coolant water flow path 35 in whole are further formed in a rear side of the cathode side separator plate 30 (a coolant water flow path 35 side). Also, a groove 41c and a groove 41a, enclosing the oxidant gas manifold aperture 42 and the fuel gas manifold aperture 43 respectively, and a groove 41w enclosing the coolant water manifold aperture 44 and the coolant water flow path 45 in whole are further formed in a rear side of the anode side separator plate 40 (a coolant water flow path 45 side).

Further, in the polymer electrolyte fuel cell 100 in this embodiment, as shown in FIG. 1, the rear side of the cathode side separator plate 30 (the coolant water flow path 35 side) and the rear side of the anode side separator plate 40 (the coolant water flow path 45 side) are joined together so that their surfaces face each other, and inserted in between the MEAs. Based on this structure, O-rings (not shown) are inserted in between the groove 31c and the groove 41c, the groove 31a and the groove 41a, and the groove 31w and the groove 41w, respectively, thereby preventing the reactant gas or the coolant water from leaking between the cathode side separator plate 30 and the anode side separator plate 40.

As described above, in the polymer electrolyte fuel cell 100 of this embodiment, by providing the main surface having a convex shape protruding toward the cathode 22 and the anode 23 respectively in the cathode side separator plate 30 and the anode side separator plate 40, the following polymer electrolyte fuel cell can be easily and reliably embodied: a sealing effect can be displayed without gas leak by compressing a gasket sufficiently, increase in electrical resistance (contact resistance) between a gas diffusion layer of the cathode 22 and the cathode side separator plate 30, and between a gas diffusion layer of the anode 23 and the anode side separator plate 40 can be suppressed, and increase in pressure loss due to close of the gas flow path and damage to the polymer electrolyte membrane by the gas diffusion layer can be avoided.

Although a case when both of the cathode side separator plate 30 and the anode side separator plate 40 have the main surface having a protruding convex shape was described in this embodiment, the main surface having a protruding convex may be provided on either one of the cathode side separator plate 30 and the anode side separator plate 40. Further, although the coolant water flow paths 35, 45 for forming the cooling unit were provided on both of the cathode side separator plate 30 and the anode side separator plate 40 in this embodiment, the coolant water flow path may be provided on either one of the cathode side separator plate 30 and the anode side separator plate 40.

Further, although the coolant water flow path is provided in between the cathode side separator plate 30 and the adjacent anode side separator plate 40 in this embodiment, the coolant water flow path can be provided, for example, in between every two unit cells instead of every one cell. In such a case, a single separator plate having the fuel gas flow path on one side and the oxidant gas flow path on the other side, serving as the anode side separator plate and the cathode side separator plate (the composite separator plate of Embodiment 2 described later, for example) can be used together.

EMBODIMENT 2

Figure 8:
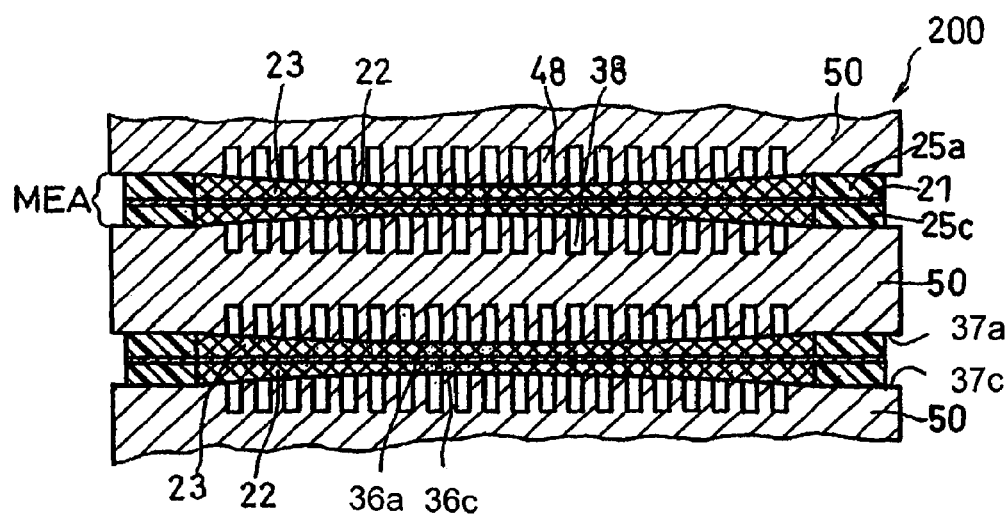
FIG. 8 is a schematic sectional view illustrating a basic structure of a polymer electrolyte fuel cell in Embodiment 2 of the present invention.

Next, a polymer electrolyte fuel cell in Embodiment 2 of the present invention will be described. In this polymer electrolyte fuel cell in Embodiment 2, the combination of the anode side separator plate 30 and the cathode side separator plate 40 in the polymer electrolyte fuel cell 100 in Embodiment 1 shown in FIG. 1 is replaced by a single composite separator plate 50, as shown in FIG. 8, and the construction except for the composite separator plate 50 is the same as that of the polymer electrolyte fuel cell 100 in Embodiment 1. FIG. 8 is a schematic sectional view illustrating a basic structure of the polymer electrolyte fuel cell in Embodiment 2 of the present invention.

Figure 9:
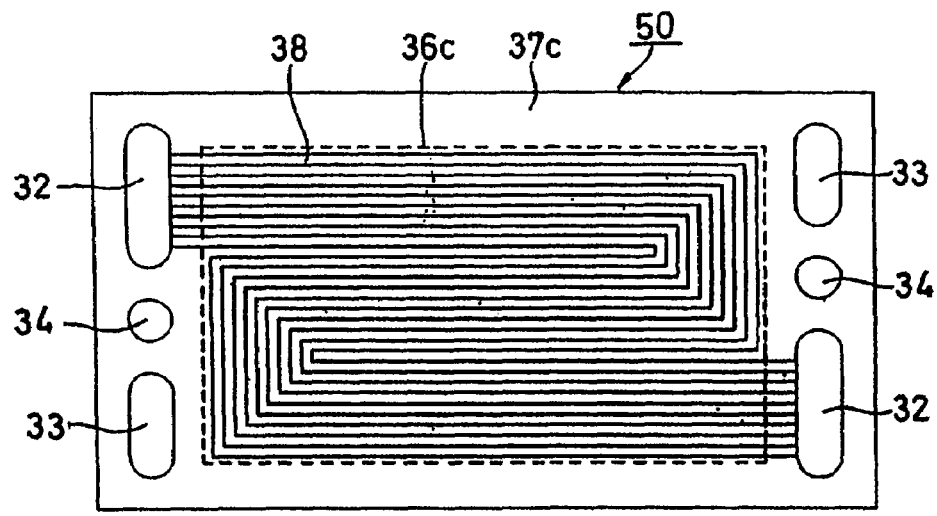
FIG. 9 is a front view enlarging a main portion of a composite separator plate 50 in a polymer electrolyte fuel cell 200 in the embodiment shown in FIG. 8.
Figure 10:
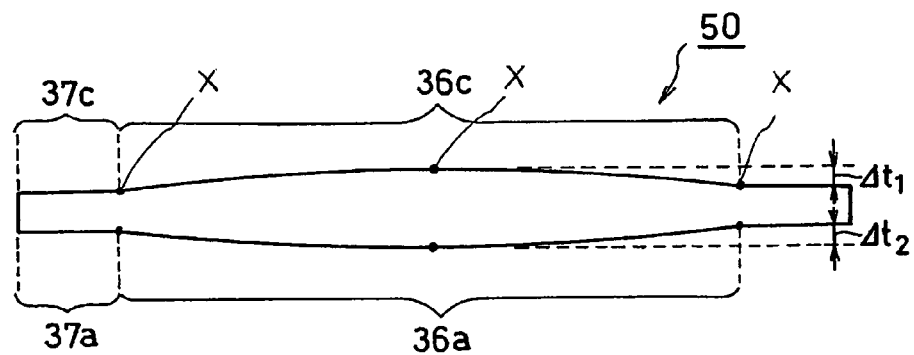
FIG. 10 is a schematic sectional view of the composite separator plate 50 shown in FIG. 9 and FIG. 11 (a cross section in a direction perpendicular to a main surface 36c, 36a).
Figure 11:
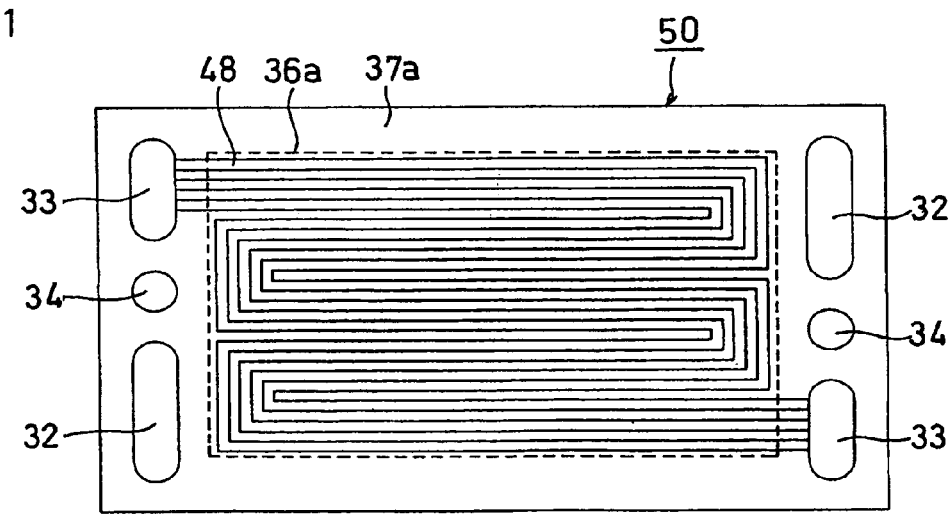
FIG. 11 is a rear view enlarging a main portion of the composite separator plate 50 shown in FIG. 9 (a front view seen from the gas flow path 48 side).

In the following, the composite separator plate 50 provided in a polymer electrolyte fuel cell 200 in Embodiment 2 (a separator plate in Embodiment 2 of the present invention) is described. FIG. 9 is a front view enlarging a main portion of the composite separator plate 50 in the polymer electrolyte fuel cell 200 in this embodiment shown in FIG. 8 (a front view seen from a gas flow path 38 side). FIG. 11 is a rear view enlarging a main portion of the composite separator plate 50 shown in FIG. 9 (a front view seen from a gas flow path 48 side). FIG. 10 is a schematic sectional view of the composite separator plate 50 shown in FIGS. 9 and 11 (a cross section in a direction perpendicular to main surfaces 36c, 36a) (the gas flow paths 38, 48 are omitted).

The composite separator plate 50 of this embodiment is a single separator plate comprising a combination of a cathode side separator plate and an anode side separator plate. Therefore, this composite separator plate 50 can embody the functions of the cathode side separator plate 30 and the anode side separator plate 40 in Embodiment 1 above just by a single constituent. Although it is preferable that the composite separator plate 50 is prepared by molding, the composite separator plate 50 can be prepared by integrating (connecting) the cathode side separator plate and the anode side separator plate of the Embodiment 1 above.

The composite separator plate 50 has a main surface 36c contacting the cathode 22 on one side, and a main surface 36a contacting the anode 23 on the other side. A gas flow path 38 for supplying an oxidant gas to the cathode 22 is formed in the main surface 36c, and a gas the flow path 48 for supplying an oxidant gas to the anode is formed in the main surface 36a.

Each of the main surfaces 36c and 36a is monolithically integrated with peripheral edge portions 37c and 37a surrounding the main surfaces respectively. The composite separator plate 50 is formed to be substantially a flat plate as a whole, but each of the main surfaces 36c and 36a has a convex shape protruding toward outside (i.e., toward the cathode 22 side or the anode 23 side). Therefore, an average thickness of a part of the main surfaces 36c and 36a is thicker than an average thickness of a part of the peripheral edge portions 37c and 37a.

In an MEA contacting the composite separator plate 50, a part of the cathode 22 and the anode 23 sandwiching the polymer electrolyte membrane 21 is compressed by a main surface 16c of the composite separator plate 50 and a main surface 16a of the other adjacent composite separator plate 50. Also, a part of the gaskets 25c and 25a sandwiching a peripheral edge portion of the polymer electrolyte membrane 21 is compressed by a peripheral edge portion 37c of the one composite separator plate 50, and a peripheral edge portion 37a of the other composite separator plate 50. Therefore, by appropriately selecting the difference of an average thickness of a part of the main surfaces 36c and 36a of the composite separator plate 50, and an average thickness of a part of the peripheral edge portion 37c and 37a, the degree of contact between the gas diffusion layer of the cathode 22 and the anode 23, and the main surfaces 36c, 36a of the composite separator plate 50, and the degree of compression of the gaskets 25c, 25a can be made proper.

The values of $\Delta t_1$ and $\Delta t_2$ in FIG. 10 can be the same or different, as long as the each of $\Delta t_1$ and $\Delta t_2$ has in the same range with $\Delta t$ in Embodiment 1 above, but preferably the same. Also, the thickness of the composite separator plate 50 may be the same with the sum of a thickness of the cathode side separator plate 30 and the anode side separator plate 40 in Embodiment 1 above.

As described above, in the polymer electrolyte fuel cell 200 of this embodiment, by providing the main surfaces 36c, 36a having a convex shape protruding toward the cathode 22 and the anode 23 respectively for a cathode side separator plate part and an anode side separator plate part forming the composite separator plate 50, the following polymer electrolyte fuel cell 200 can be easily and reliably embodied: a sealing effect can be displayed without gas leak by compressing the gaskets 25c and 25a sufficiently; increase in electrical resistance (contact resistance) between a gas diffusion layer of the cathode 22 and the composite separator plate 50, and between a gas diffusion layer of the anode 23 and the composite separator plate 50 can be suppressed; and increase in pressure loss due to close of the gas flow path and damage to the polymer electrolyte membrane 21 by the gas diffusion layers 38, 48 can be avoided.

Although a cooling unit is not provided for the inside of the composite separator plate 50 in this embodiment, it is preferable that a coolant water flow path is provided for the inside of the composite separator plate 50, in every 2-3 MEAs. For example, a combination of the cathode side separator plate 30 and the anode side separator plate 40 in Embodiment 1 above can be used instead of some composite separator plates 50 among a plurality of the composite separator plates 50.

Although the embodiments of the present invention are described in detail in the above, the present invention is not to be limited to each embodiment described above.

For example, in the polymer electrolyte fuel cell of the present invention, the cathode side separator plate 30 and the anode side separator plate 40 in Embodiment 1 above can be used together with the composite separator plate 50 of Embodiment 2 of the above.

Although in the above embodiments, the gas flow path 38 for the oxidant gas is formed with five parallel grooves and the gas flow path 48 for the fuel gas is formed with three parallel grooves, the number of the grooves forming each gas flow path is not limited to the embodiments above. The groove forming the above gas flow path is of a serpentine shape combining straight lines and turns, and a centerline of the groove is made to correspond with each other in its front side and rear side, except for inevitable parts. Therefore, when an MEA is sandwiched by such a pair of separator plates, the gas flow paths 38 and 48 on both sides of the polymer electrolyte membrane 21 are at a position opposing each other interposing the polymer electrolyte membrane 21, as shown in FIG. 1 and FIG. 8.

Also, as to the separator plate of the present invention, it is preferable that the thickest part of the main surface above has a thickness of approximately 3.0 mm. And it is preferable that a depth and a width of a groove forming the gas flow path, and a width of a part forming a lib in between the grooves is approximately 1.0 mm at the time of clamping the polymer electrolyte fuel cell.

Hereafter, the present invention is described further in detail in the following Example, but the present invention is not to be limited thereto.

EXAMPLE 1

A polymer electrolyte fuel cell of the present invention comprising a unit cell 1 was made by using the cathode side separator plate 30 and the anode side separator plate 40 in the above Embodiment 1.

First, a cathode catalyst-carrying carbon powder (Pt:50 weight %) is obtained by causing a conductive carbon powder having an average primary particle size of 30 nm (Ketjen black EC (a product name): product of AKZO Chemie B.V., the Netherlands) to carry platinum particles having an average particle size of 3 nm. Also, an anode catalyst-carrying carbon powder (Pt:25 weight %, Ru:25 weight %) is obtained by causing the same conductive carbon powder as the above to carry platinum particles and ruthenium particles each having an average particle size of 30 angstrom.

The above cathode catalyst-carrying carbon powder is dispersed in isopropanol, and then an ethyl alcohol dispersion of perfluorocarbon sulfonic acid powder was mixed, so as to prepare a paste for forming a cathode catalyst layer. Similarly, the above anode catalyst-carrying carbon powder is dispersed in isopropanol, and then an ethyl alcohol dispersion of perfluorocarbon sulfonic acid powder was mixed, so as to prepare a paste for forming an anode catalyst layer.

Next, a cathode was made by coating the above paste for forming a cathode catalyst layer on one side of a gas diffusion layer composed of a carbon nonwoven fabric having a thickness of 250 µm, by screen printing. At this time, adjustment was made so that an amount of the electrode catalyst (Pt) to be 0.5 mg/cm$^2$, and an amount of perfluorocarbon sulfonic acid to be 1.2 mg/cm$^2$ in the cathode. Similarly, an anode was made by coating the above paste for forming an anode catalyst layer on one side of a gas diffusion layer of a carbon nonwoven fabric having a thickness of 250 µm, by screen printing. At this time, adjustment was made so that an amount of the electrode catalyst (Pt) to be 0.5 mg/cm$^2$, and an amount of perfluorocarbon sulfonic acid to be 1.2 mg/cm$^2$ in the anode.

Then, a polymer electrolyte membrane (Nafion 112 (a product name), manufactured by E.I. du Pont de Nemours and Company, U.S.A, with a thickness of 30 µm) having an area one size larger than an area of the cathode or the anode is prepared, and a center part of the polymer electrolyte membrane is sandwiched by the above cathode and anode so as to come into contact with a catalyst layer of the anode side and a catalyst layer of the cathode side, and the above polymer electrolyte membrane, the above cathode, and the above anode are bonded by hot pressing. Further, at outer peripheries of the cathode and the anode, gaskets (Viton-GBL, product of DuPont Dow Elastomer Japan, made of a fluorine-containing rubber, free thickness:0.8 mm) made by blanking to have almost the same shape with peripheries of the separator plates mentioned later were bonded by hot pressing, to make an MEA.

The above MEA is sandwiched by the cathode side separator plate 30 and the anode side separator plate 40 described in Embodiment 1, and clamped so that the thickness of the above gasket becomes 0.5 mm, thereby making the unit cell 1 having a structure shown in FIG. 1 (a polymer electrolyte fuel cell of the present invention). At this time, in the cathode side separator plate 30 and the anode side separator plate 40, the difference Δt between the thickness of the thickest part of the respective main surfaces 36 and 46, and an average thickness of the respective peripheral edge portions 37 and 47 is set to be 10 μm.

[Characteristic Evaluation]

The contact resistance (mΩ·cm$^2$) of the separator plate and the gas diffusion layer, and the pressure loss (kPa) which occurs when certain amounts of reactant gases (the fuel gas and the oxidant gas) is flown were measured using the polymer electrolyte fuel cell of the present invention thus made.

In a polymer electrolyte fuel cell, when the contact resistance is over 20 mΩ·cm$^2$, a voltage drop due to the effect of IR loss becomes notable, thereby making it less practical. Therefore, the case when the contact resistance is not more than 20 mΩ·cm$^2$ is categorized as "1," and the case when the contact resistance is over 20 mΩ·cm$^2$ is categorized as "2." Also, when the pressure loss is over 10 kPa, energy conversion efficiency decreases, and power needed for supplying reactant gases increase, thereby making it less practical. Therefore, the case when the pressure loss is not more than 10 kPa is categorized as "1," and the case when the pressure loss is over 10 kPa is categorized as "2." Then, for overall evaluation, the case when the results for both the contact resistance and the pressure loss are "1" is marked as "1(pass)," and the case when either one is "2" is marked as "2(fail)." The results are shown in Table 1.

EXAMPLE 2

A polymer electrolyte fuel cell (a unit cell) of the present invention is made in the same manner as Example 1, except that the value of Δt is set to be 20 μm. The characteristic evaluation is conducted also in the same manner. The result is shown in Table 1.

EXAMPLE 3

A polymer electrolyte fuel cell (a unit cell) of the present invention is made in the same manner as Example 1, except that the value of Δt is set to be 30 μm. The characteristic evaluation is conducted also in the same manner. The result is shown in Table 1.

EXAMPLE 4

A polymer electrolyte fuel cell (a unit cell) of the present invention is made in the same manner as Example 1, except that the value of Δt is set to be 5 μm. The characteristic evaluation is conducted also in the same manner. The result is shown in Table 1.

COMPARATIVE EXAMPLE 1

A polymer electrolyte fuel cell (a unit cell) of the present invention is made in the same manner as Example 1, except that in the cathode side separator plate 30 and the anode side separator plate 40, the main surfaces 36, 46 are made to have a convex shape protruding toward inner side (i.e., the coolant water flow paths 35, 45 side), made to have a thickness thinner than the peripheral edge portions 37, 47, and the value Δt is set to −5 μm. The characteristic evaluation is conducted also in the same manner. The result is shown in Table 1.

COMPARATIVE EXAMPLE 2

A polymer electrolyte fuel cell (a unit cell) of the present invention is made in the same manner as Example 1, except that the value Δt is set to 50 μm. The characteristic evaluation is conducted also in the same manner. The result is shown in Table 1.

COMPARATIVE EXAMPLE 3

A polymer electrolyte fuel cell (a unit cell) of the present invention is made in the same manner as Example 1, except that the value Δt is set to 100 μm. The characteristic evaluation is conducted also in the same manner. The result is shown in Table 1.

TABLE 1

|  | Δt (μm) | Contact Resistance | Pressure Loss | Overall Evaluation |
|---|---|---|---|---|
| Comparative Example 1 | −5 | 2 | 1 | 2 |
| Example 4 | 5 | 1 | 1 | 1 |
| Example 1 | 10 | 1 | 1 | 1 |
| Example 2 | 20 | 1 | 1 | 1 |
| Example 3 | 30 | 1 | 1 | 1 |
| Comparative Example 2 | 50 | 1 | 2 | 2 |
| Comparative Example 3 | 100 | 1 | 2 | 2 |

From the results of Table 1, it can be concluded that an excellent polymer electrolyte fuel cell which has less contact resistance and less pressure loss can be obtained when the difference Δt of a thickest part of the main surface of the separator plate and a thickness of the peripheral edge portion is 5-30 μm.

As described above, in a polymer electrolyte fuel cell of the present invention, the contact resistance between electrodes (cathode and anode) and a separator plate is decreased, and pressure loss becomes stable. Therefore, the polymer electrolyte fuel cell of the present invention can be preferably used for a portable power source, an electric vehicle, a household cogeneration system, and so on.

The invention claimed is:

1. A polymer electrolyte fuel cell comprising: a membrane-electrode assembly having a hydrogen ion conductive polymer electrolyte membrane, and an anode and a cathode sandwiching said polymer electrolyte membrane; and
    an anode side separator plate and a cathode side separator plate disposed to support said membrane-electrode assembly from both sides thereof, said anode and said cathode each having a gas diffusion layer and a catalyst layer contacting said polymer electrolyte membrane,
    wherein at least one of said anode side separator plate and said cathode side separator plate includes a main surface portion entirely contacting said gas diffusion layer and a peripheral edge portion surrounding said main surface portion, said peripheral edge portion being formed to be flat,
    said main surface portion has a convex shape protruding toward said gas diffusion layer side, and has a gas flow path for supplying a reactant gas to said anode or said cathode,
    a thickness of at least one of said anode side separator plate and said cathode side separator plate increases or decreases in proportion to the shapes of the said main surface portion's protrusions;

the surface of said main surface portion is formed so that a cross section perpendicular to said main surface portion draws a curve, the center of said main surface portion being the highest and the height gradually decreases toward said peripheral edge portion, said curve has an inflection point; and an average thickness of said main surface portion is thicker than an average thickness of said peripheral edge portion, and a difference Δt between a thickness of the thickest portion of said main surface portion and an average thickness of said peripheral edge portion is 5-30 μm.

2. The polymer electrolyte fuel cell in accordance with claim 1, wherein said difference Δt is 5-10 μm.

3. The polymer electrolyte fuel cell in accordance with claim 1, wherein a thickness of said gas diffusion layer is 150-200 μm.

4. The polymer electrolyte fuel cell in accordance with claim 1, wherein a cross sectional area of said gas flow path is substantially uniform throughout said main surface portion when said membrane-electrolyte assembly is clamped with said anode side separator plate and said cathode side separator plate.

5. The polymer electrolyte fuel cell in accordance with claim 1, wherein said peripheral edge portion has a reactant gas manifold aperture and a coolant water manifold aperture.

6. The polymer electrolyte fuel cell in accordance with claim 1, wherein at least one of said anode side separator plate and said cathode side separator plate has a coolant water flow path at a side opposite to said polymer electrolyte membrane side.

7. The polymer electrolyte fuel cell in accordance with claim 1, wherein an elevation change is provided in between said main surface portion and said peripheral edge portion.

8. The polymer electrolyte fuel cell in accordance with claim 1, wherein a thickness of said peripheral edge portion is formed to be thinner than said main surface portion.

9. The polymer electrolyte fuel cell in accordance with claim 1, wherein said gas flow path in said main surface portion is formed to be the deepest at a center portion and the depth gradually becomes shallow toward said peripheral edge portion.

10. A polymer electrolyte fuel cell comprising: two or more membrane-electrode assemblies having a hydrogen ion conductive polymer electrolyte membrane, and an anode and a cathode sandwiching said polymer electrolyte membrane; and two or more separator plates stacked alternately with said membrane-electrode assemblies, each of said anode and said cathode having a gas diffusion layer and a catalyst layer contacting said polymer electrolyte membrane, wherein at least one of said separator plates is a composite separator plate comprising a combination of an anode side separator plate and a cathode side separator plate, each of said anode side separator plate and said cathode side separator plate includes a main surface portion entirely contacting said anode and said cathode, and a peripheral edge portion, said peripheral edge portion being formed to be flat, said main surface portions have a convex shape protruding toward said anode side and said cathode side respectively, and have a gas flow path for supplying a fuel gas and an oxidant gas to said anode and said cathode respectively, a thickness of at least one of said anode side separator plate and said cathode side separator plate increases or decreases in proportion to the shapes of the said main surface portion's protrusions;

the surface of said main surface portion is formed so that a cross section perpendicular to said main surface portion draws a curve, the center of said main surface portion being the highest and the height gradually decreases toward said peripheral edge portion, said curve has an infection point; and an average thickness of said main surface portion is thicker than an average thickness of said peripheral edge portion, and a difference Δt between a thickness of the thickest portion of said main surface portion and an average thickness of said peripheral edge portion is 5-30 μm.

11. The polymer electrolyte fuel cell in accordance with claim 10, wherein said difference Δt is 5-10 μm.

12. The polymer electrolyte fuel cell in accordance with claim 10, wherein a thickness of said gas diffusion layer is 150-200 μm.

13. The polymer electrolyte fuel cell in accordance with claim 10, wherein a cross sectional area of said gas flow path in said composite separator plate is substantially uniform throughout said main surface portion when said two or more membrane-electrolyte assemblies are clamped with said two or more separator plates.

14. The polymer electrolyte fuel cell in accordance with claim 10, wherein said peripheral edge portion has a reactant gas manifold aperture and a coolant water manifold aperture.

15. The polymer electrolyte fuel cell in accordance with claim 10, wherein a coolant water flow path is provided in between said anode side separator plate and said cathode side separator plate.

16. The polymer electrolyte fuel cell in accordance with claim 10, wherein an elevation change is provided in between said main surface portion and said peripheral edge portion.

17. The polymer electrolyte fuel cell in accordance with claim 10, wherein a thickness of said peripheral edge portion is formed to be thinner than a thickness of said main surface portion.

18. The polymer electrolyte fuel cell in accordance with claim 10, wherein said gas flow path in said main surface portion is formed to be the deepest at a center portion and the depth gradually becomes shallow toward said peripheral edge portion.

* * * * *